United States Patent
Graton et al.

(10) Patent No.: US 6,186,897 B1
(45) Date of Patent: *Feb. 13, 2001

(54) TORSIONAL DAMPER, IN PARTICULAR FOR MOTOR VEHICLE FRICTION CLUTCH

(75) Inventors: Michel Graton, Paris; Fabrice Tauvron, Athis-Mons, both of (FR)

(73) Assignee: Valeo, Paris (FR)

(*) Notice: Under 35 U.S.C. 154(b), the term of this patent shall be extended for 0 days.

This patent is subject to a terminal disclaimer.

(21) Appl. No.: 09/230,513
(22) PCT Filed: May 28, 1998
(86) PCT No.: PCT/FR98/01068
  § 371 Date: Jan. 27, 1999
  § 102(e) Date: Jan. 27, 1999
(87) PCT Pub. No.: WO98/54487
  PCT Pub. Date: Dec. 3, 1998

(30) Foreign Application Priority Data

May 30, 1997 (FR) .................................. 97 06657

(51) Int. Cl.[7] ...................................... F16D 3/12
(52) U.S. Cl. ................. 464/63; 464/68; 464/67; 464/66; 192/213.11; 192/213.22; 192/213.21
(58) Field of Search .................. 192/213.12, 213.11, 192/213.22, 213.21; 464/68, 67, 66, 63

(56) References Cited

U.S. PATENT DOCUMENTS

| 4,852,711 | | 8/1989 | Kitano et al. . |
| 4,969,855 | * | 11/1990 | Graton et al. .................. 192/213.12 |
| 5,249,660 | * | 10/1993 | Feldhaus et al. ....................... 464/68 |
| 5,795,230 | * | 8/1998 | Lefevre ................................. 464/68 |
| 5,885,160 | * | 3/1999 | Tauvron ................................ 464/63 |

FOREIGN PATENT DOCUMENTS

| 296 11 793 U | 8/1996 | (DE) . |
| 19642913 | 4/1997 | (DE) . |
| 0732525 | 9/1996 | (EP) . |
| 2531162 | 2/1984 | (FR) . |
| 2735548 | 12/1996 | (FR) . |

* cited by examiner

Primary Examiner—Lynne H. Browne
Assistant Examiner—Aaron M Dunwoody
(74) Attorney, Agent, or Firm—Liniak, Berenato, Longacre & White

(57) ABSTRACT

A torsion damper for a motor vehicle clutch comprising, between an entrance component (11) and an exit component (12), a pre-damper (C), an intermediate damper (B) and a main damper (A). The axially operating elastic means (26B) included in the intermediate damper (B) are radially arranged between the elastic members with said intermediate damper (B) circumferentially operating elastic members (23B) and those of pre-damper (C).

10 Claims, 1 Drawing Sheet

TORSIONAL DAMPER, IN PARTICULAR FOR MOTOR VEHICLE FRICTION CLUTCH

BACKGROUND OF THE INVENTION

1. Field of the Invention

The invention concerns torsional damper devices of the type used in the construction of a motor vehicle friction clutch, for example.

2. Description of Related Art

Torsional damper devices of the above kind usually include, between an input member and an output member rotatable relative to each other, two dampers which, in kinematic terms, come into action successively upon relative angular movement between the input member and the output member, namely, in the reverse order to that in which they come into action, a main damper and a pre-damper, each of these dampers including two guide washers which, disposed on respective opposite axial sides of a web, are rotatable relative to the web, circumferentially acting spring means disposed circumferentially between the guide washers and the web, and friction means which, operative between the guide washers and the web or parts constrained to rotate therewith, are acted on by axially acting spring means.

In the construction of a friction clutch the input member is for example a disc which carries friction linings at its periphery which are clamped between the pressure plate and the reaction plate of the clutch and the output member is for example a hub adapted to be constrained to rotate with the input shaft of a gearbox.

The function of the dampers is to filter out vibrations caused by the engine, when idling in the case of the pre-damper and in normal operation in the case of the main damper.

To satisfy particular operating conditions document FR-A-2 735 548, to which this patent application explicitly refers, proposes the provision of a third or intermediate damper which comes into action after the pre-damper and before the main damper.

SUMMARY OF THE INVENTION

An aim of the invention is to reduce the overall axial size of a torsional damper device including an intermediate damper of the above kind.

To be more precise, it consists in a torsional damper device of the kind briefly described hereinabove and which includes an intermediate damper, the torsional damper device being generally characterised in that the axially acting spring means of the intermediate damper are disposed radially between its circumferentially acting spring means and those of the pre-damper.

Accordingly, these axially acting spring means do not require any particular axial space to fit them, which advantageously has the benefit of reducing the overall axial size of the clutch.

The pre-damper and the intermediate damper both being on the same axial side of the web of the main damper, with first friction means operative on the other side of the web, forming part of the friction means of the main damper, and third friction means forming part of the friction means of the pre-damper and offset radially relative to the first friction means, in accordance with the invention the corresponding guide washer of the main damper preferably and advantageously has an annular portion between said first friction means and said third friction means which is offset axially towards the web of the main damper.

This advantageously forms a recess on the surface of the guide washer concerned of the main damper facilitating the operation at its location of any other member external to the torsional damper device, for example the control device usually associated with a clutch for engaging and disengaging the clutch.

This advantageously facilitates installing the torsional damper device in accordance with the invention in an increasingly congested environment.

BRIEF DESCRIPTION OF THE DRAWINGS

The features and advantages of the invention will emerge from the following description given by way of example and with reference to the accompanying diagrammatic drawings, in which.

DETAILED DESCRIPTION OF THE PREFERRED EMBODIMENTS

Figure 1:
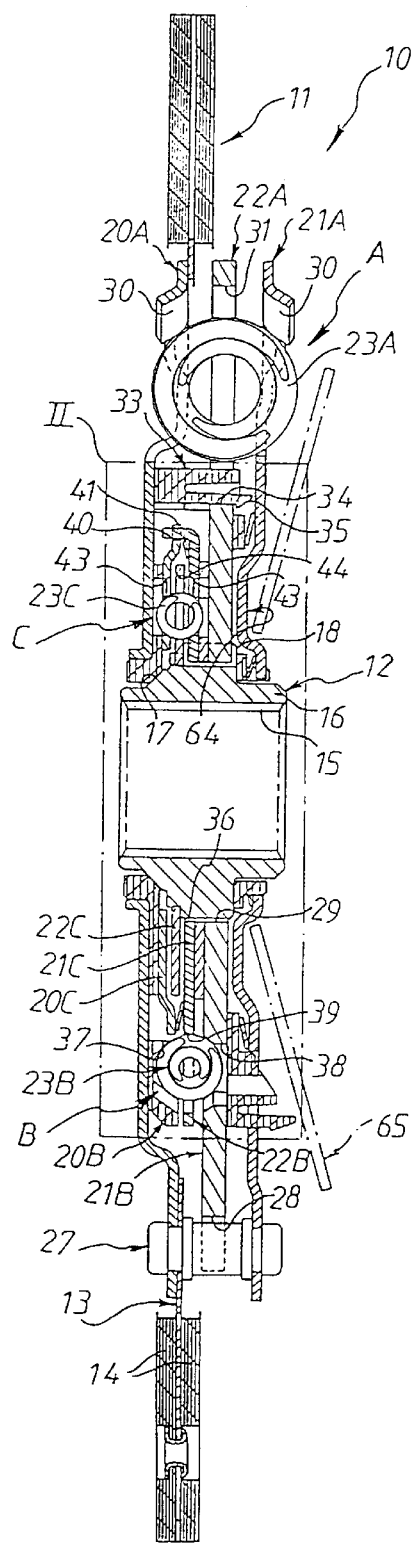
FIG. 1 is a view in axial section of a torsional damper device.
Figure 2:
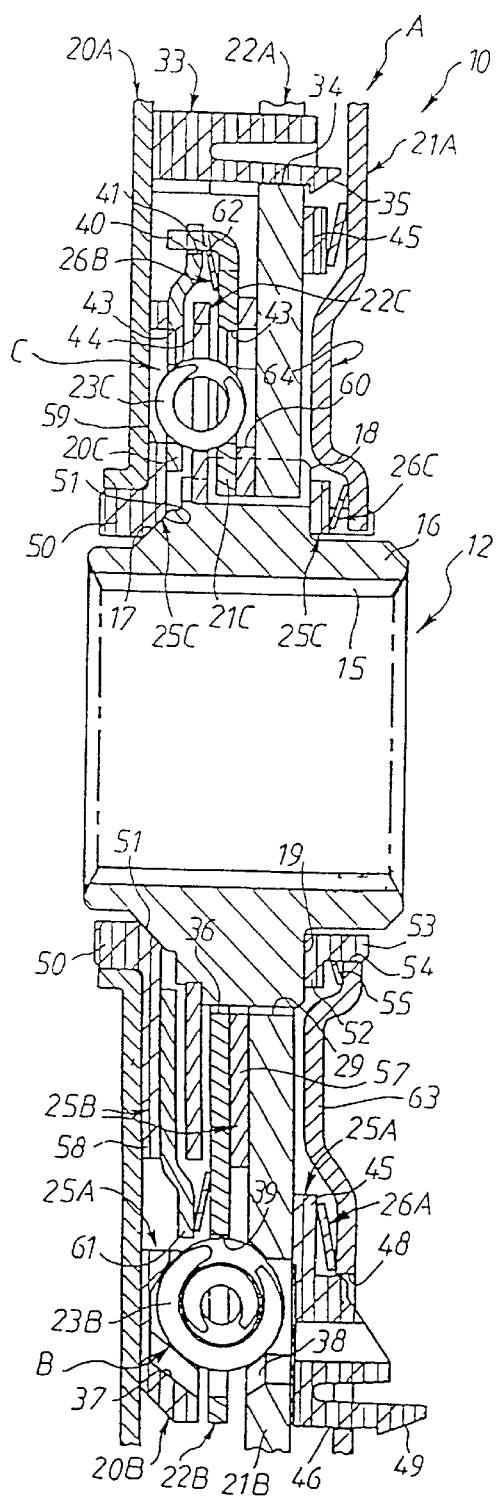
FIG. 2 shows the detail II from FIG. 1 to a larger scale.

The figures show a torsional damper device 10 of the type described in the previously mentioned document FR-A-2 735 548.

Accordingly the torsional damper device 10 does not need to be described in complete detail here and, as and when required, the description of document FR-A-2 735 548 must be deemed to constitute an integral part of the present description.

The torsional damper device 10 includes three dampers A, B, C between an input member 11 and an output member 12 that are rotatable relative to each other. In kinematic terms the three dampers come into action successively upon relative angular movement between the input member 11 and the output member 12, namely, and in the reverse order to that in which they come into action, a main damper A, an intermediate damper B and a pre-damper C.

Because the present example refers to a motor vehicle friction clutch, here the input member 11 is a disc 13 carrying annular friction linings 14 at its periphery and on both faces.

Here the output member 12 is a hub with internal splines 15, a reduced height external portion 16 at one end and an external frustoconical bearing surface 17 at the other end, with splines 18 between them.

At the same end as the reduced height portion 16 the output member 12 has a transverse shoulder 19 continuous with the corresponding end edge of the splines 18.

The dampers A, B, C each comprise respective pairs of guide washers 20A–21A, 20B–21B, 20C–21C which, on respective opposite axial sides of a respective web 22A, 22B, 22C, can rotate relative to the web within particular relative angular movement limits, respective circumferentially acting spring means 23A, 23B, 23C disposed circumferentially between the guide washers 20A–21A, 20B–21B, 20C–21C and the web 22A, 22B, 22C and respective friction means 25A, 25B, 25C operative between the guide washers 20A–21A, 20B–21B, 20C–21C and the web 22A, 22B, 22C or parts constrained to rotate therewith, are acted on by respective axially acting spring means 26A, 26B, 26C. The spring members 26A, 26B, 26C are preferably pre-stressed to reduce noise.

Here the guide washers 20A, 21A of the main damper A are fastened together and held a particular distance apart by spacers 27 at their periphery and by which the disc 13 carrying the friction linings 14 is fastened to the guide washer 20A.

The spacers 27 pass with circumferential clearance through notches 28 provided for this purpose at the outside periphery of the web 22A and co-operate with the ends of the notches 28 to define the limits of angular movement of the guide washers 20A, 21A relative to the web 22A.

The web 22A also has notches 29 at its inside periphery, through which it meshes with circumferential clearance with the splines 18 of the output member 12.

The circumferentially acting spring means 23A of the main damper A are partly located inside windows 30 in the guide washers 20A, 21A and partly inside facing windows 31 in the web 22A.

Here each comprises two elongate coaxial coil springs substantially tangential to a circumference of the assembly.

Here the intermediate damper B and the pre-damper C are both on the same axial side of the web 22A of the main damper A, between that web 22A and the guide washer 20A.

They are therefore both axially between the guide washers 20A, 21A of the main damper A.

The intermediate damper B, which surrounds the pre-damper C, is for the most part radially under, i.e. short of, the circumferentially acting spring means 23A of the main damper A.

Its guide washer 21B is formed by the web 22A of the main damper A, to be more precise by the radially innermost portion of that web 22A.

Its guide washer 20B is a synthetic material confinement member disposed axially in contact with the guide washer 20A of the main damper A.

The guide washer 20B, which is the guide washer of the intermediate damper B at the greater axial distance from the web 22A of the main damper A, has axial tenons 33 constraining it to rotate with the web 22A, the tenons 33 engaging with notches 34 provided for this purpose in the edges of the windows 31 in the web 22A.

The tenons 33 advantageously pass completely through the web 22A, are shaped to form elastically deformable hooks 35 beyond the web 22A and are adapted to clip onto the web to form a sub-assembly with it.

As this sub-assembly is not in itself relevant to the present invention it will not be described in more detail here.

At its inside periphery the web 22B has notches 36 which mesh with circumferential clearance with the splines 18 on the output member 12, but the clearance here is less than that of the web 22A of the main damper A.

The circumferentially acting spring means 23B of the intermediate damper B are engaged partly in recesses 37 in the guide washer 20B and in windows 38 in the guide washer 21B and partly in facing windows 39 in the web 22B.

Here each comprises two elongate coaxial coil springs substantially tangential to a circumference of the assembly.

Here the limits of relative angular movement between the guide washers 20B, 21B of the intermediate damper B and the web 22B thereof are defined by the circumferential ends of the notches 29 in the web 22A of the main damper A abutting on the splines 18 of the output member 12.

Here one of the guide washers 20C, 21C of the pre-damper C is formed by the web 22B of the intermediate damper B, to be more precise by the radially innermost portion of that web 22B.

Here it is the guide washer 21C at the shorter axial distance from the web 22A of the main damper A.

For constraining them to rotate together one of the guide washers 20C, 21C (here the guide washer 21C) has axial lugs 40 circumferentially spaced from the circumferentially acting spring means 23B of the intermediate damper B and radially beyond the web 22C. These lugs engage with notches 41 on the other guide washer 20C, 21C (here the guide washer 20C).

Here the axial lugs 40 on the guide washer 21C extend towards the guide washer 20A of the main damper A and the notches 41 in the guide washer 20C are at its outside periphery.

Here the web 22C of the pre-damper C is constrained to rotate with the output member 12, its inside periphery being engaged with and crimped to a reduced height portion of the splines 18 of the output member 12.

The circumferentially acting spring members 23C of the pre-damper C are partly engaged in windows 43 in the guide washers 20C, 21C and partly in facing windows 44 in the web 22C.

Here each comprises an elongate coil spring substantially tangential to a circumference of the assembly.

Here the limits of relative angular movement between the guide washers 20C, 21C of the pre-damper C and its web 22C are defined by circumferential ends of the notches 36 in the web 22B of the intermediate damper B abutting against the splines 18 of the output member 12.

The friction means 25A of the main damper A include, in addition to the guide washer 20B of the intermediate damper B, a friction washer 45 on the opposite side of the web 22A to the guide washer 20B and in contact with the web 22A.

The associated axially acting spring means 26A are here in the form of a Belleville washer that bears on the guide washer 21A.

Here the friction washer 45 is substantially level with the guide washer 20B and therefore at a distance from the output member 12.

Here the friction washer 45 has axial tenons 46 which are offset radially away from the output member 12 and constrain it to rotate with the guide washer 21A, the tenons 46 engaging with openings 48 provided for this purpose in the guide washer 21A.

The tenons 46 advantageously pass completely through the guide washer 21A, are shaped as elastically deformable hooks 49 beyond the guide washer 21A and are adapted to clip onto the guide washer to form a sub-assembly with it.

As this sub-assembly is not in itself relevant to the present invention it will not be described in more detail here.

The tenons 46 are also used to centre the Belleville washer constituting the axially acting spring means 26A.

Here the friction means 25C of the pre-damper C include, on the one hand, a bearing 50 operative between the output member 12 and the guide washer 20A of the main damper A, to centre the guide washer 20A, and which has a frustoconical bearing surface 51 through which it bears on the frustoconical bearing surface 17 of the output member 12 and, on the other hand, a friction washer 52 at the other end of the output member 12 which bears on the transverse shoulder 19 of the output member 12, possibly through an intermediate washer, not shown.

The friction washer 52 has axial tenons 53 along its inside periphery constraining it to rotate with the guide washer 21A of the main damper A, the tenons 53 engaging with notches 54 provided for this purpose at the inside periphery of the guide washer 21A.

Similarly, the bearing 50 is constrained to rotate with the guide washer 20C of the pre-damper C by tenons that cannot be seen in the figures.

Here the associated axially acting spring means 26C are formed by a Belleville washer which is centred by the tenons 53 with which it is engaged via notches 55.

In accordance with the invention the axially acting spring means 26B of the intermediate damper B are disposed radially between the circumferentially acting spring members 23B of the intermediate damper B and those 23C of the pre-damper C.

Here the guide washers 20C, 21C of the pre-damper C are mobile relative to each other in the axial direction and the axially acting spring means 26B of the intermediate damper B are disposed axially between them.

The axially acting spring means 26B therefore urge the guide washers 20C, 21C of the pre-damper C axially away from each other.

The friction means 25B of the intermediate damper B include a first friction washer 57 disposed axially between its web 22B and one of the guide washers 20B, 21B, here the guide washer 21B formed by the web 22A of the main damper A, and a second friction washer 58 disposed axially between the guide washer 20C of the pre-damper C at the greater distance from the web 22A of the main damper A and the guide washer 20A of the main damper A at the shorter distance from the guide washer 20C.

Here the second friction washer 58 is in one piece with the bearing 50 and includes windows 59 in which the circumferentially acting spring members 23C are axially engaged, which has the benefit of reducing the overall axial size of the assembly.

Similarly, the first friction washer 57 includes windows 60 in which the circumferentially acting spring members 23C are axially engaged, which has the benefit of reducing the overall axial size of the assembly.

Here the axially acting spring means 26B of the intermediate damper B are disposed radially between the web 22C of the pre-damper C and the circumferentially acting spring members 23B of the intermediate damper B.

One of the guide washers 20C, 21C of the pre-damper C advantageously has an annular portion 61 offset axially towards the other one and the axially acting spring means 26B of the intermediate damper B are advantageously level with this offset annular portion 61.

Here the guide washer 20C, 21C including the offset annular portion 61 is the guide washer 20C, i.e. that at the greater distance from the web 22A of the main damper A.

The offset annular portion 61 is advantageously operative at the outside periphery of the guide washer 20C and it is therefore this annular portion that has the notches 41 which engage with the axial lugs 40 of the guide washer 21C.

By virtue of its being offset, the annular portion 61 of the guide washer 20C advantageously reduces the length of the axial lugs 40 of the guide washer 21C.

Here the axially acting spring means 26B of the intermediate damper B are formed by a Belleville washer which is centred on the axial lugs 40 of the guide washer 21C and which includes notches 62 constraining it to rotate with the axial lugs 40.

Consequently there are operative on the other side of the web 22A of the main damper A first friction means that form part of the friction means 25A of the main damper A and which here comprise the friction washer 45 and third friction means which form part of the friction means 25C of the pre-damper C and which are offset radially relative to the first friction means, here the third friction means comprising the friction washer 52.

In accordance with the invention, the corresponding guide washer 21A of the main damper A has an annular portion 63 offset axially towards the web 22A of the main damper A between the first friction means consisting of the friction washer 45 and the third friction means consisting of the friction washer 52.

The stiffness of the circumferentially acting spring members 23C of the pre-damper C is less than that of the circumferentially acting spring members 23B of the intermediate damper B which is in turn less than that of the circumferentially acting spring members 23A of the main damper A.

At the beginning of their intervention the members 23B advantageously apply a lower torque than that applied by the members 23C at the end of their intervention. Similarly, at the beginning of their intervention the members 23A apply a torque which is lower than that applied by the members 23B at the end of their intervention.

The stiffness of the axially acting spring means 26C of the pre-damper C is lower than that of the axially acting spring means 26B of the intermediate damper B which is in turn less than that of the axially acting spring means 26A of the main damper A.

When the input member 11 and the output member 12 rotate relative to each other in operation only the circumferentially acting spring members 23C of the pre-damper C are initially compressed.

At this time only the friction means 25C of the pre-damper C are operative.

The circumferentially acting spring members 23B of the intermediate damper B and the members 23A of the main damper A constrain the guide washers 20C, 21C of the pre-damper C to rotate with the guide washers 20A, 21A of the damper A with which the friction washer 52 constituting the friction means 25C is constrained to rotate, and likewise the bearing 50 through the intermediary of the guide washer 20C of the pre-damper C.

The circumferentially acting spring members 23B of the intermediate damper B are then compressed but the circumferentially acting spring members 23C of the pre-damper C remain compressed.

At the same time the friction means 25B of the intermediate damper B add their effects to those of the friction means 25C of the pre-damper C.

The guide washers 20B, 21B of the intermediate damper B then turn relative to the guide washers 20A, 21A and to the web 22A of the main damper A and the friction washers 57, 58 constituting the friction means 25 are operative between them and the latter.

Finally, the circumferentially acting spring members 23A of the main damper A are compressed but the circumferentially acting spring members 23B of the intermediate damper B and those 23C of the pre-damper C remain compressed.

At the same time, the friction means 25A of the main damper A come into action, adding their effects to those of the friction means 25C of the pre-damper C, but only some of the friction means 25B of the intermediate damper B, namely the friction washer 58, continue to be operative.

The circumferentially acting spring members 23C of the pre-damper C and those 23B of the intermediate damper B then constrain the output member 12 to rotate with the guide washers 20C, 21C, 20B, 21B and therefore the web 22A, only the guide washers 20A, 21A of the main damper A of the input member 11 then moving relative to the previously assembly.

Consequently, on relative angular movement between the input member 11 and the output member 12, the pre-damper C directly upstream of the output member 12 is the first to come into action, the intermediate damper B is the second to come into action and the main damper A, which in kinematic terms is driven directly by the input member 11, is the third and last to come into action.

It follows from the aforegoing description that the three dampers A, B, C are disposed in series.

If required their circumferentially acting spring members 23A, 23B, 23C can be pre-stressed in their respective housings (windows 30, 38, 43 or recesses 37).

To prevent discontinuous operation the final torque of the pre-damper C can be greater than the pre-stressing of the circumferentially acting spring member 23B of the intermediate damper B and the final torque of the intermediate damper B can be greater than the pre-stressing of the circumferentially acting spring members 23A of the main damper A.

The offset annular portion 63 of the guide washer 21A of the main damper A of the torsional damper device 10 in accordance with the invention, which is whichever of the guide washers 20A, 21A is at the greater distance from the input member 11, includes a recess 64 which can receive the actuator device 65 for engaging or disengaging the clutch concerned, as shown diagrammatically in chain-dotted outline in FIG. 1.

As shown diagrammatically in FIG. 1, the actuator device 65 comprises the fingers of a diaphragm, for example.

As already indicated, the hooks 35 and 49 enable the assembly of sub-assemblies.

The hooks 35, 49 are advantageously in one piece with the corresponding tenons 33, 46 and are preferably narrower than the tenons in the circumferential direction so as not to contribute to the transmission of torque, which reduces the stresses on them.

If required, the friction washer 57 can have male teeth on its inside periphery meshing with the splines 18 on the output member 12, as described in document EP-A-0 732 525, to which reference may be had for more information, in particular with regard to the width of the windows 60 that the friction washer 57 includes.

Rotational coupling with the facility for axial movement of the guide washers 20C, 21C, and therefore friction, are obtained by virtue of the axial lugs 40 on the guide washer 21C and the notches 41 on the guide washer 20C.

The invention is not limited to the embodiment described and shown but encompasses any variant execution within the scope of the claims.

For example the axially acting spring means employed can consist at least in part in a corrugated washer.

Also, all the embodiments disclosed in document FR-A-2 735 548 can be envisaged.

What is claimed is:

1. A torsional damper device of the kind including, between an input member (11) and an output member (12) rotatable relative to each other, three dampers (A, B, C) which, in kinematic terms, come successively into action upon relative angular movement between said input member (11) and said output member (12), namely, in the opposite order to that in which they come into action, a main damper (A), an intermediate damper (B) and a pre-damper (C), each of said dampers (A, B, C) including two guide washers (20A–21A, 20B–21B, 20C–21C) on respective opposite axial sides of a web (22A, 22B, 22C) and rotatable relative thereto, circumferentially acting spring members (23A, 23B, 23C) disposed circumferentially between the guide washers (20A–21A, 20B–21B, 20C–21C) and the web (22A, 22B, 22C), and friction means (25A, 25B, 25C) operative between the guide washers (20A–21A, 20B–21B, 20C–21C) and the web (22A, 22B, 22C) or parts constrained to rotate therewith, are acted on by axially acting spring means (26A, 26B, 26C), characterised in that the axially acting spring means (26B) of the intermediate damper (B) are disposed radially between the circumferentially acting spring members (23B) of the intermediate damper (B) and those (23C) of the pre-damper (C).

2. A torsional damper device according to claim 1 characterised in that one of the guide washers (20C, 21C) of the pre-damper (C) is formed by the web (22B) of the intermediate damper (B), the guide washers (20C, 21C) are mobile relative to each other in the axial direction and the axially acting spring means (26B) of the intermediate damper (B) are disposed axially between them.

3. A torsional damper device according to claim 2 characterised in that the axially acting spring means (26B) of the intermediate damper (B) are disposed radially between the web (22C) of the pre-damper (C) and the circumferentially acting spring members (23B) of the intermediate damper (B).

4. A torsional damper device according to claim 3 characterised in that one of the guide washers (20C, 21C) of the pre-damper (C) has an annular portion (61) offset axially towards the other one and the axially acting spring means (26B) of the intermediate damper (B) are level with this offset annular portion (61).

5. A torsional damper device according to claim 1 characterised in that the friction means (25B) of the intermediate damper (B) include a first friction washer (57) disposed axially between its web (22B) and one of its guide washers (20B, 21B) and a second friction washer (58) disposed axially between the guide washer (20C) of the pre-damper (C) at the greater distance from the web (22A) of the main damper (A) and the guide washer (20A) of the main damper (A) at the shorter distance from the guide washer (20C).

6. A torsional damper device according to claim 5 characterised in that the first friction washer (57) of the intermediate damper (B) includes windows (60) in which the circumferentially acting spring members (23C) of the pre-damper (C) are axially engaged.

7. A torsional damper device according to claim 5 characterised in that the second friction washer (58) of the intermediate damper (B) includes windows (59) in which the circumferentially acting spring members (23C) of the pre-damper (C) are axially engaged.

8. A torsional damper device according to claim 1 characterised in that the axially acting spring means (26B) of the intermediate damper (B) are formed by a Belleville washer and in that one of the guide washers (20C, 21C) of the pre-damper (C) has axial lugs (40) engaged with notches (41) on the other one and the Belleville washer forming the axially acting spring means (26B) of the intermediate damper (B) has notches (62) constraining it to rotate with the axial lugs (40).

9. A torsional damper device according to claim 1 characterised in that the pre-damper (C) and the intermediate damper (B) are both on the same axial side of the web (22A) of the main damper (A) and there are operative on the other side of the web (22A) first friction means which form part of the friction means (25A) of the main damper (A) and third friction means which form part of the friction means (25C) of the pre-damper (C) and which are offset radially relative to the first friction means and the corresponding guide washer (21A) of the main damper (A) has an annular portion (634) offset axially towards the web (22A) of the main damper (A) between said first friction means and said third friction means.

10. A torsional damper device according to claim 1 characterised in that the guide washer (20B) of the intermediate damper (B) at the greater axial distance from the web (22A) of the main damper (A) has axial tenons (33) constraining it to rotate with the web (22A) and the tenons (33) pass completely through the web (22A), are shaped as elastically deformable hooks (35) beyond the web (22A) and are adapted to clip thereto.

* * * * *